(12) United States Patent
Bosma et al.

(10) Patent No.: US 12,201,080 B2
(45) Date of Patent: Jan. 21, 2025

(54) MILKING ARRANGEMENT (71) Applicant: DELAVAL HOLDING AB, Tumba (SE)

(72) Inventors: Epke Bosma, Tumba (SE); Andrés Lundh, Tumba (SE)

(73) Assignee: DeLaval Holding AB, Tumba (SE)

( * ) Notice: Subject to any disclaimer, the term of this patent is extended or adjusted under 35 U.S.C. 154(b) by 333 days.

(21) Appl. No.: 17/916,537

(22) PCT Filed: Mar. 25, 2021

(86) PCT No.: PCT/SE2021/050265
§ 371 (c)(1),
(2) Date: Sep. 30, 2022

(87) PCT Pub. No.: WO2021/201750
PCT Pub. Date: Oct. 7, 2021

(65) Prior Publication Data
US 2023/0157255 A1 May 25, 2023

(30) Foreign Application Priority Data
Mar. 30, 2020 (SE) .................... 2050353-8

(51) Int. Cl.
A01J 7/02 (2006.01)
(52) U.S. Cl.
CPC .................... A01J 7/022 (2013.01)
(58) Field of Classification Search
CPC .................... A01J 7/022
See application file for complete search history.

(56) References Cited

U.S. PATENT DOCUMENTS 2,915,073 A  12/1959  Merritt
3,618,621 A  11/1971  Nordegren
(Continued)

FOREIGN PATENT DOCUMENTS

WO       99/39569      8/1999
WO     2009/029041    3/2009
(Continued)

OTHER PUBLICATIONS

Search Report for SE Application No. 2050353-8 dated Nov. 11, 2020, 3 pages.
(Continued)

Primary Examiner — Monica L Perry
Assistant Examiner — Brittany A Lowery
(74) Attorney, Agent, or Firm — NIXON & VANDERHYE (57) ABSTRACT A milking arrangement includes a milk transport line (1), a plurality of milk stations, and a cleaning arrangement (4) with a delivery arrangement (5) configured to deliver a cleaning liquid into the milk transport line (1) and a pump (6) configured to pump the cleaning liquid through the milk transport line (1) at a pressure larger than atmospheric pressure, thereby filling the transport line (1) with cleaning liquid. A control unit (9) is configured to determine a volume and/or length of the milk transport line (1) on basis of registered first point of time of pump start, a second point of time of passage of cleaning liquid through the milk transport line (1), and the amount of liquid introduced into the milk transport line from the first point of time to the second point of time.

20 Claims, 4 Drawing Sheets (56) References Cited

U.S. PATENT DOCUMENTS

| | | |
|---|---|---|
| 4,061,504 A | 12/1977 | Zall et al. |
| 6,323,033 B1 | 11/2001 | Van Den Berg |
| 7,155,971 B2 | 1/2007 | Wamhof et al. |
| 2004/0118432 A1 | 6/2004 | Kenowski et al. |
| 2006/0196529 A1 | 9/2006 | Kenowski et al. |
| 2010/0252119 A1* | 10/2010 | Westman ............. B08B 9/0325 137/455 |
| 2010/0313921 A1 | 12/2010 | Wilson et al. |
| 2011/0041770 A1* | 2/2011 | Westman ............... B08B 9/055 119/14.18 |
| 2017/0359995 A1 | 12/2017 | Sellner et al. |

FOREIGN PATENT DOCUMENTS

| | | |
|---|---|---|
| WO | 2010/069669 | 6/2010 |
| WO | 2011/045302 | 4/2011 |

OTHER PUBLICATIONS

International Search Report for PCT/SE2021/050265 dated Jun. 4, 2021, 4 pages.
Written Opinion of the ISA for PCT/SE2021/050265 dated Jun. 4, 2021; 5 pages.

* cited by examiner

MILKING ARRANGEMENT

CROSS-REFERENCE TO RELATED APPLICATIONS

This application is the U.S. national phase of International Application No. PCT/SE2021/050265 filed Mar. 25, 2021 which designated the U.S. and claims priority to SE Patent Application No. 2050353-8 filed Mar. 30, 2020, the entire contents of each of which are hereby incorporated by reference.

TECHNICAL FIELD

The present invention relates to a milking arrangement comprising a milk transport line with a plurality of milk stations, a cleaning arrangement comprising a cleaning liquid delivery arrangement, a pump for pumping the cleaning liquid through the milk transport line with a pressure above atmospheric pressure, sensor arrangements for detecting amount of liquid amount of cleaning liquid delivered into the milk transport line and the start time for such delivery, and a control unit configured to receive input for the sensor arrangements.

BACKGROUND

In connection to the setting up of a cleaning arrangement, it is of large interest to know the length and volume of the tubing of a milk transport line that is to be repeatedly cleaned by means of the cleaning arrangement. By knowledge of the volume and length of the milk transport line, cleaning parameters, such as used amount cleaning liquid and detergents, and cleaning time, are set. According to prior art the setting of the cleaning parameters is a manual process in which the length and volume of the milk transport line is approximately calculated by addition of known separate lengths tubing of the milk transport line to each other. On basis of such approximate calculation, the set cleaning parameters, such as amount of liquid used for cleaning, amount of detergent used, pump output, et cetera.

However, such systems do not adapt to changes in milk transport lines such as changed length of the milk transport line and leakages. The user of the system must either repeatedly do manual checks of the volume and length of the milking transport line or rely on that the set cleaning parameters will be such that they will enable sufficient cleaning also in case of at least minor changes of the volume or length of the milk transport line or minor leakages thereon. The use of such safe-margins will thus result in excessive use of cleaning liquid and detergents in those cases in which no change has taken place. Alternatively, time consuming manual measurement will have to be performed.

OBJECT OF THE INVENTION

It is an object of the present invention to provide a milking arrangement that removes the need of manual setting of the length and/or manual setting of operation parameters of a cleaning arrangement associated to the length of a milk transport line of a milking arrangement.

SUMMARY

The object of the invention is achieved by means of a milking arrangement comprising:
a milk transport line,
a plurality of milk stations connected to the milk transport line,
a milk container connected to the milk transport line and configured to receive milk transported from the milk stations to the milk container via the milk transport line, and
a cleaning arrangement configured to introduce a liquid into the milk transport line and to transport the liquid through the milk transport line, said cleaning arrangement comprising
a delivery arrangement configured to deliver a cleaning liquid into the milk transport line,
a pump configured to pump the cleaning liquid through the milk transport line at a pressure larger than atmospheric pressure, thereby filling the transport line with cleaning liquid,
a first sensor arrangement configured to measure an amount of cleaning liquid delivered by the delivery arrangement into the milk transport line and to detect the point of time at which cleaning liquid starts flowing through the milk transport line,
a second sensor arrangement configured to detect the point of time at which cleaning liquid has traveled through the milk transport line,
a control unit configured to receive input from the first sensor arrangement regarding the amount of cleaning liquid delivered by the delivery arrangement into the milk transport line and the point of time at which cleaning liquid starts flowing through the milk transport line, and to receive input from the second sensor arrangement regarding the point of time at which cleaning liquid has traveled through the milk transport line, and configured to control the delivery arrangement on basis of said input received from said first and second sensor arrangements,
said milking arrangement being characterized in that the control unit is configured to determine a volume and/or length of the milk transport line on basis of said input from said first and second sensor arrangements, and configured to control the delivery arrangement on basis thereof.

In particular the control unit comprises a memory and a processor. Data regarding the inner diameter of tubes defining the milk transport line, and data regarding inner volume of possible further components such a heat exchangers or filters arranged along the milk transport line and filled with the cleaning liquid during cleaning is provided in said memory, and the processor is configured to determine a length of the milk transport line on basis of said data and the volume and/or length of the milk transport line determined by the control unit on basis of said input from said first and second sensor arrangements.

According to one embodiment, the milking arrangement comprises a valve device provided in the milk transport line adjacent the milk container, wherein the cleaning arrangement comprises a cleaning return line extending from a said valve device to the delivery arrangement.

According to one embodiment, the second sensor arrangement is configured to detect the point of time at which cleaning liquid has traveled through the milk transport line and through the cleaning return line, and the control unit is configured to determine the volume and/or length of the milk transport line and the cleaning return line on basis of said input from said first and second sensor arrangements, and configured to control the delivery arrangement on basis thereof.

According to one embodiment, the first sensor arrangement comprises a flow meter.

According to one embodiment, the delivery arrangement comprises a tray via which the cleaning liquid is conducted to the milk transport line, and the first sensor arrangement comprises a level meter arranged in said tray.

According to one embodiment, the first sensor arrangement comprises the pump.

According to one embodiment, the second sensor arrangement comprises any of a flow meter, a temperature sensor or an electric conductivity sensor.

According to one embodiment, the cleaning return line is provided with a drain branch and a valve arrangement configured to open for expelling of cleaning liquid through the drain branch or to close the drain branch and to open for return of the cleaning liquid to the delivery arrangement, and the control unit is configured to control said valve arrangement on basis of the determined volume and/or length of the milk transport line.

According to one embodiment, the cleaning arrangement comprises a purge arrangement, and the control unit is configured to control said purge arrangement on basis of the determined volume and/or length of the milk transport line.

According to one embodiment, the control unit is configured to perform its determination of the volume and/or length of the milk transport line repeatedly, preferably at the beginning of each new cleaning sequence.

The control unit is configured to save in a readable memory the volume and/or length of the milk transport line determined in connection to a set up of the milking system and to compare later determinations of the volume and/or length of the milk transport line performed by the control unit with the volume and/or length of the milk transport line determined in connection to said set up. A processor of the control unit 9 is configured to give an alert if the difference between a later determined volume and/or length and the volume and/or length of the milk transport line determined in connection to a set up is above a predetermined value.

According to one embodiment, the milking arrangement comprises a plurality of milk transport lines, each one being connected to a plurality of milking stations and being connected in parallel with each other and connected to the cleaning arrangement, wherein the control unit is configured to determine a volume and/or length of each milk transport line on basis of input from said first and second arrangements, and configured to control the delivery arrangement for delivery of cleaning to the respective transport line during cleaning thereof on basis of the determined volume and/or length of the respective milk transport line.

According to one embodiment, the control unit is subdivided into a plurality of sub control units, and each milk transport line has its own dedicated sub control unit configured to control the cleaning of the milk transport line to which it is dedicated.

The object of the invention is also achieved by means of a method of controlling a milking arrangement, said arrangement comprising
- a milk transport line,
- a plurality of milk stations connected to the milk transport line,
- a milk container connected to the milk transport line and configured to receive milk transported from the milk stations to the milk container via the milk transport line, and
- a cleaning arrangement configured to introduce a liquid into the milk transport line and to transport the liquid through the milk transport line, said cleaning arrangement comprising
    - a delivery arrangement configured to deliver a cleaning liquid into the milk transport line,
    - a pump configured to pump the cleaning liquid through the milk transport line at a pressure larger than atmospheric pressure, thereby filling the transport line with cleaning liquid,
    - a first sensor arrangement configured to measure an amount of cleaning liquid delivered by the delivery arrangement into the milk transport line and to detect the point of time at which cleaning liquid starts flowing through the milk transport line,
    - a second sensor arrangement configured to detect the point of time at which cleaning liquid has traveled through the milk transport line, and
    - a control unit comprising a readable storage memory and a processor said method being characterized in that it comprises the steps of
- registering a first point of time of start of delivery of cleaning liquid into the milk transport line and storing said registration in said storage memory,
- registering a second point of time at which the cleaning liquid entering the milk transport line at the first point of time has traveled through the milk transport line and storing said registration in said storage memory
- registering an amount of cleaning liquid that has been delivered into the milk transport line from the first point of time to the second point of time and storing said registration in said storage memory,
- determining, by means of said processor, a volume and/or length of the milk transport line on basis of said registrations and controlling the operation of the delivery arrangement on basis of the determined volume and/or length.

According to one embodiment, the method comprises the further steps of
- storing in said memory an inner diameter of tubes defining the milk transport line, and
- storing in said memory an inner volume and/or length of any further component arranged along the milk transport line, wherein the further component is a component that will be filled with the cleaning liquid during cleaning of the milk transport line, and
- determining, by means of said processor, the length of the milk transport line on basis of the determined volume and/or length of the milk transport line, said inner diameter and said inner volume of further components, and controlling the operation of the delivery arrangement on basis of the determined length of the milk transport line.

BRIEF DESCRIPTION OF THE DRAWING

Exemplifying embodiments of the drawing will be described with reference to the annexed drawing, on which.

DETAILED DESCRIPTION OF EMBODIMENTS

Figure 1:
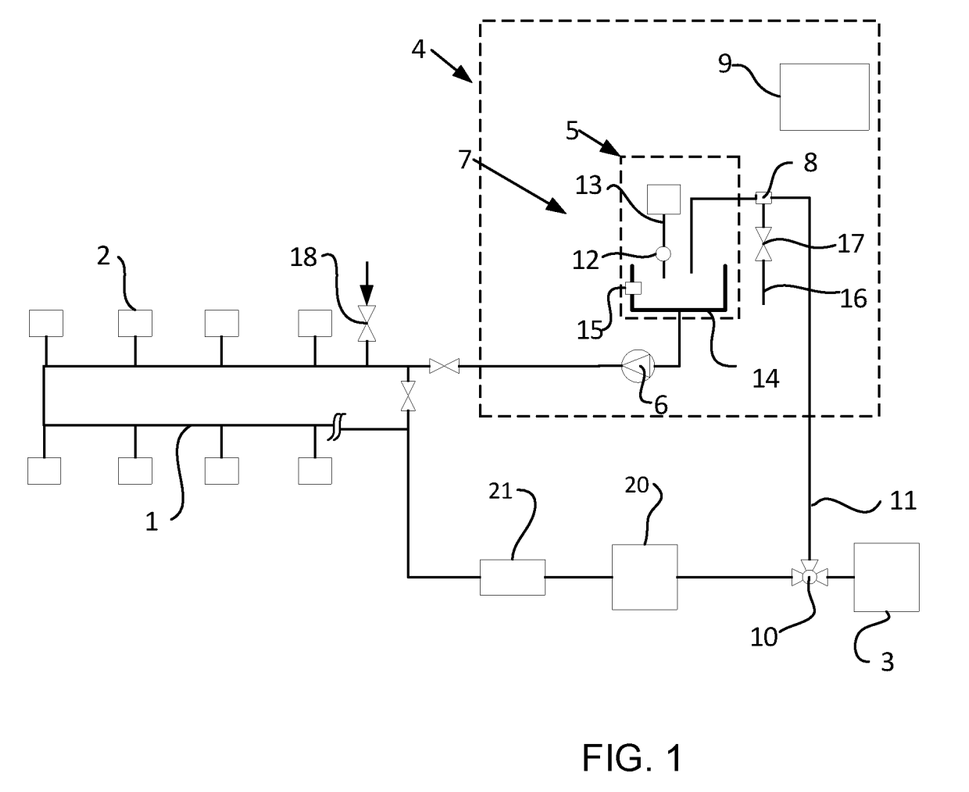
FIG. 1 is a schematic representation of a milking system according to the invention.

FIG. 1 shows a milking arrangement comprising a milk transport line 1 and a plurality of milk stations 2 connected to the milk transport line 1. The part of the milk transport line 1 along which the milk stations 2 are arranged may have a length exceeding 100 meters, while the remaining part of the milk transport line is substantially shorter.

The milking arrangement further comprise a milk container 3 connected to the milk transport line 1 and configured to receive milk transported from the milk stations 2 to the milk container 3 via the milk transport line 1.

The milking arrangement also comprises a cleaning arrangement 4 configured to introduce a liquid into the milk transport line 1 and to transport the liquid through the milk transport line 1.

The cleaning arrangement 4 comprises a delivery arrangement 5 configured to deliver a cleaning liquid into the milk transport line, and a pump 6 configured to pump the cleaning liquid through the milk transport line 1 at a pressure larger than atmospheric pressure, thereby filling the transport line 1 with cleaning liquid. The pressure generated by the pump 6 should be such that a column of cleaning liquid, fully filling the tubing which it passes through, advances through the milk transport line 1 at the start of a cleaning sequence. The pump 6 may preferably be a centrifugal pump.

There is also provided a first sensor arrangement 7 configured to measure an amount of cleaning liquid delivered by the delivery arrangement 5 into the milk transport line 1 and to detect the point of time at which cleaning liquid starts flowing through the milk transport line 1.

In addition to the first sensor arrangement, there is also a second sensor arrangement 8 configured to detect the point of time at which cleaning liquid has traveled through the milk transport line 1.

Furthermore there is provided a control unit 9 configured to receive input from the first sensor arrangement 7 regarding the amount of cleaning liquid delivered by the delivery arrangement 5 into the milk transport line 1 and the point of time at which cleaning liquid starts flowing through the milk transport line 1. The control unit 9 may comprise one or more physical entities and may comprise a readable memory as well as a processor.

The control unit 9 is also configured to receive input from the second sensor arrangement regarding the point of time at which cleaning liquid has traveled through the milk transport line 1.

The control unit 9 is configured to determine a volume and/or length of the milk transport line 1 on basis of said input from said first and second sensor arrangements 7, 8, and configured to control the delivery arrangement 5 on basis of such input.

The control unit 9 may be configured to determine the volume and/or length of the milk transport line repeatedly, preferably each time a cleaning sequence is started.

A deviation of the determined volume and/or length from a foregoing cleaning sequence, for example caused by a leakage along the milk transport line 1, may thus be detected, and the control unit is preferably configured to give an alert to a user upon such deviation. The control unit 9 is configured to save in a readable memory the volume and/or length of the milk transport line determined by the control unit 9 in connection to a set up of the milking system and to compare later determinations performed by the control unit 9 with the volume and/or length of the milk transport line determined in connection to said set up. A processor of the control unit 9 is configured to give an alert if the difference between a later determined volume and/or length and the volume and/or length of the milk transport line determined in connection to a set up is above a predetermined value.

The milking arrangement further comprises a valve device 10 provided in the milk transport line 1 adjacent the milk container 3, and the cleaning arrangement 4 comprises a cleaning return line 11 extending from a said valve 10 device to the delivery arrangement 5.

The second sensor arrangement 8 is configured to detect the point of time at which cleaning liquid has traveled through the milk transport line 1 and through the cleaning return line 11. The control unit 9 is configured to determine the volume and/or length of the milk transport line 1 and the cleaning return line 11 on basis of said input from said first and second sensor arrangements 7, 8. The inner volume and the length of the cleaning liquid return line 11 is normally substantially shorter than the inner volume and length of the milk transport line 1. The length of the milk transport line 1 may be a factor 10 or longer than the cleaning return line 11. Typically, the milk transport line 1 has a length above 100 meters. The volume and length of the cleaning return line may be preset data stored in the readable memory of the control unit 9. Depending on where the second sensor arrangement is located, the control unit 9 may thus be configured to take into consideration the volume of the cleaning liquid return line 11 when determining the volume and/or length of the milk transport line.

In the embodiment shown in FIG. 1, the first sensor arrangement 7 comprises a flow meter 12 provided in a delivery line 13 connected to a water source (not shown).

The flow meter may, however, as an alternative be embodied by the pump 6 which is then configured to measure the amount of liquid that flows through it.

The start of the pump 6 may also be the indication of the first point of time, indicating when cleaning liquid starts flowing into the milk transport line 1. In cases in which there is a distance of tubing, hereinafter called further tubing, of a predetermined inner volume between the pump 6 and the milk transport line 1, the volume of such further tubing may be preset data in the storage memory of the control unit 9 and the control unit 9 may be configured to take the volume of such further tubing into consideration when determining the volume and/or length of the milk transport line 1.

The delivery arrangement 5 comprises a tray 14 via which the cleaning liquid from the delivery line 13 is conducted to the milk transport line 1. The first sensor arrangement 7 also comprises a level meter 15 arranged in connection to said tray 14, which level meter 15 supplements the flow meter 12 arranged in the delivery line 13.

The second sensor arrangement 8 comprises a sensor able of detecting when a front of cleaning liquid reaches the position of that sensor. In the exemplifying embodiment the second sensor arrangement comprises a temperature sensor. The sensor arrangement 8 also comprise a time counter which recognizes a point of time at which the sensor detects the front of cleaning liquid.

The cleaning return line 11 is provided with a drain branch 16 and a valve arrangement 17 configured to open for expelling of cleaning liquid through the drain branch 16 or to close the drain branch 16 and to open for return of the cleaning liquid into tray 14 of the delivery arrangement 5. The control unit 9 is configured to control said valve 17 arrangement on basis of the determined volume and/or length of the milk transport line 1.

The milking arrangement comprises a purge arrangement 18 configured to blow the milk transport line free from remaining liquid, and the control unit 9 is configured to control said purge arrangement 18 on basis of the determined volume and/or length of the milk transport line 1.

Data regarding the inner diameter of tubes defining the milk transport line 1, and data regarding inner volume of possible further components such as heat exchangers 20 or filters 21 arranged along the milk transport line 1 and filled with the cleaning liquid during cleaning is provided in the memory of the control unit 9, and the processor is configured to determine a length of the milk transport line 1 on basis of said data and the volume and/or length of the milk transport line 1 determined by the control unit on basis of said input from said first and second sensor arrangements 7, 8.

Figure 2:
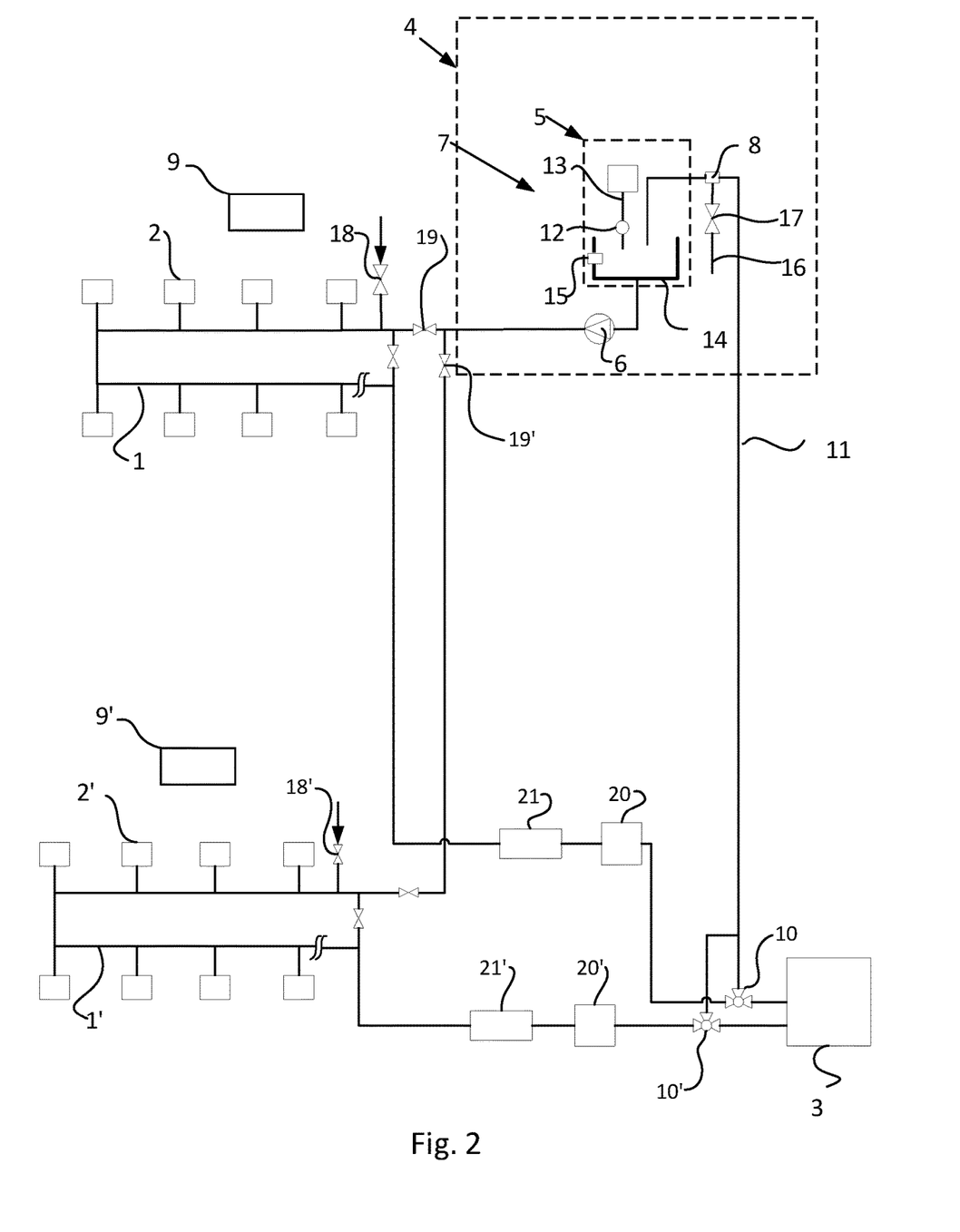
FIG. 2 is a schematic representation of an alternative embodiment milking system according to the invention.

FIG. 2 shows an embodiment in which the milking arrangement comprises a plurality of, in this case two, milk transport lines 1, 1', each one being connected to a plurality of milking stations 2, 2' and being connected in parallel with each other in relation to the cleaning arrangement 4, and connected to the cleaning arrangement 4.

The control unit is subdivided in control sub-units 9, 9', one for each of the plurality of milk transport lines 1, 1'. Each control sub-unit 9, 9' is configured to determine a volume and/or length of its respective milk transport line 1, 1' on basis of input from said first and second arrangements 7, 8. Each control sub-unit 9, 9' is configured to control the delivery arrangement 5 for delivery of cleaning liquid to the respective transport line 1, 1' during cleaning thereof on basis of the determined volume and/or length of the respective transport line 1, 1'. Each milk transport line 1, 1' has its dedicated purge arrangement 18, 18'. Each milk transport line 1, 1' is individually and selectably connectable to the milk tank 3 and to the return line 11 via dedicated valve arrangements 10, 10'. The cleaning arrangement 4 is selectably connectable to each respective milk transport line 1, 1' via respective valves 19, 19'. Accordingly, an individual milk transport line can be cleaned by means of the cleaning arrangement 4 while another milk transport line is harvesting milk from its milk stations and delivering it to the milk tank 3.

Figure 3:
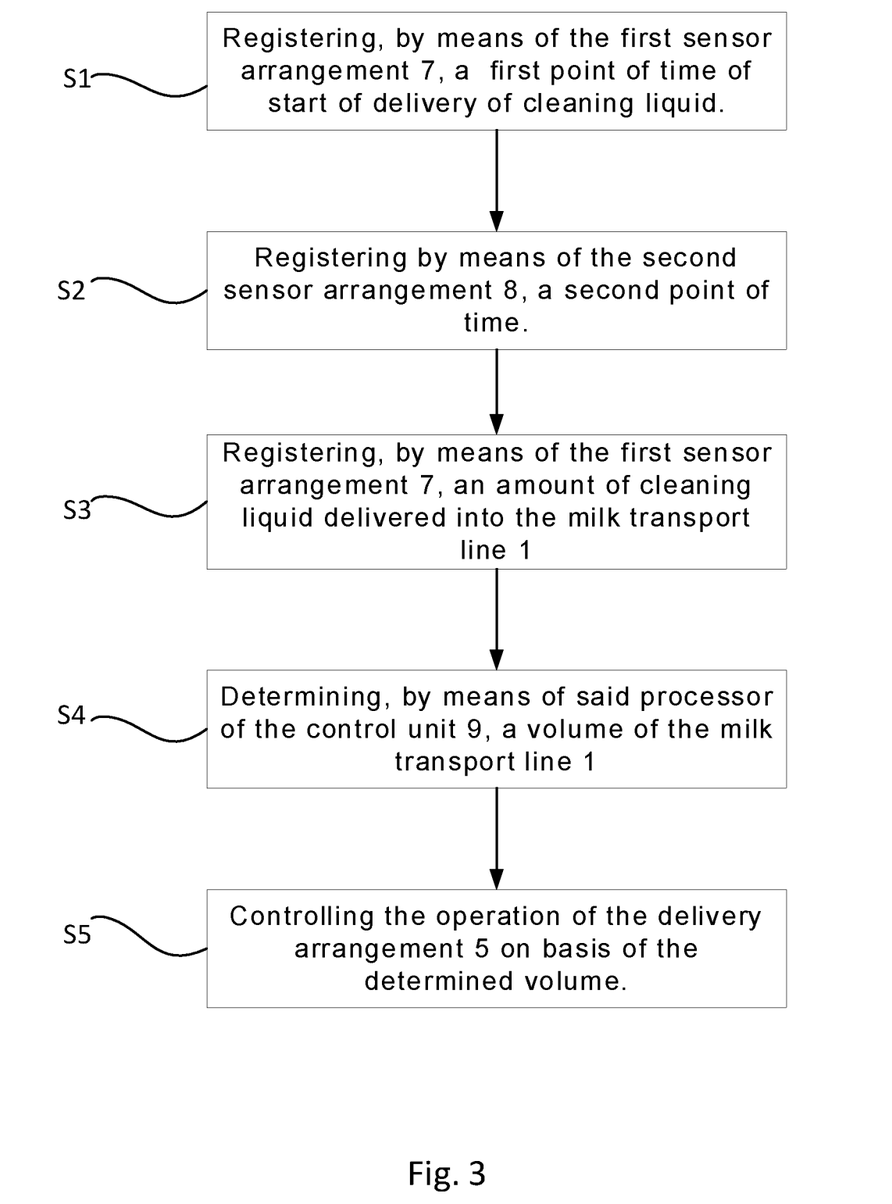
FIG. 3 is flow diagram showing an embodiment of a method according to the invention.

FIG. 3 shows a flow scheme showing an embodiment of a method according to the invention as applied onto the milking arrangement shown in FIG. 1 or to each of the milk transport lines 1, 1', 1" in the milking arrangement shown in FIG. 2.

The method comprises the steps of:

S1: registering, by means of the first sensor arrangement 7, a first point of time of start of delivery of cleaning liquid into the milk transport line and storing said registration in said storage memory, S2: registering, registering by means of the second sensor arrangement 8, a second point of time at which the cleaning liquid entering the milk transport line at the first point of time has traveled through the milk transport line and storing said registration in said storage memory S3: registering, by means of the first sensor arrangement 7, an amount of cleaning liquid that has been delivered into the milk transport line 1 from the first point of time to the second point of time and storing said registration in said storage memory, and S4: determining, by means of said processor of the control unit 9 (or the respective control sub-unit in the embodiment shown in FIG. 2), a volume and/or length of the milk transport line 1 on basis of said registrations and S5: controlling the operation of the delivery arrangement 5 on basis of the determined volume and/or length.

Figure 4:
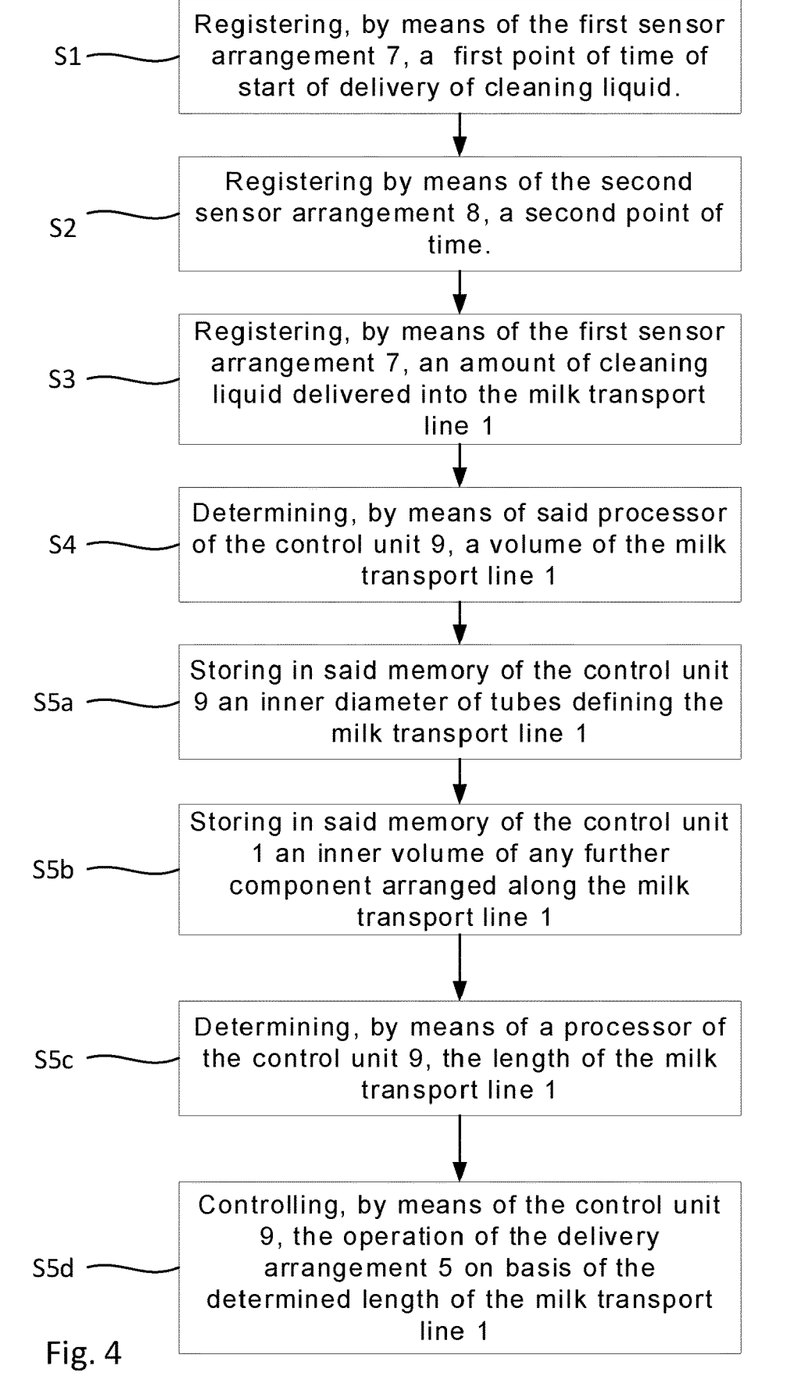
FIG. 4 is a flow diagram showing an alternative embodiment of the method.

The method may, as an alternative shown in FIG. 4, comprise the following steps, replacing step S5 in FIG. 3:

S5a: storing in said memory of the control unit 9 an inner diameter of tubes defining the milk transport line 1, and S5b: storing in said memory of the control unit 1 an inner volume of any further component arranged along the milk transport line 1, wherein the further component is a component that will be filled with the cleaning liquid during cleaning of the milk transport line, and S5c: determining, by means of said processor, the length of the milk transport line 1 on basis of the determined volume and/or length of the milk transport line 1, said inner diameter and said inner volume of further components, and S5d: controlling, by means of the control unit 9, the operation of the delivery arrangement 5 on basis of the determined length of the milk transport line 1.

The invention claimed is:

1. A milking arrangement comprising:
 a milk transport line (1),
 a plurality of milk stations (2) connected to the milk transport line (1),
 a milk container (3) connected to the milk transport line (1) and configured to receive milk transported from the milk stations (2) to the milk container (3) via the milk transport line (1), and
 a cleaning arrangement (4) configured to introduce a liquid into the milk transport line (1) and to transport the liquid through the milk transport line (1), said cleaning arrangement (4) comprising
  a delivery arrangement (5) configured to deliver a cleaning liquid into the milk transport line (1),
  a pump (6) configured to pump the cleaning liquid through the milk transport line (1) at a pressure larger than atmospheric pressure, thereby filling the transport line (1) with cleaning liquid,
  a first sensor arrangement (7) configured to measure an amount of cleaning liquid delivered by the delivery arrangement (5) into the milk transport line (1) and to detect a first point of time at which cleaning liquid starts flowing through the milk transport line (1),
  a second sensor arrangement (8) configured to detect a second point of time at which cleaning liquid has traveled through the milk transport line (1),
  a control unit (9) configured to receive input from the first sensor arrangement (7) regarding the amount of cleaning liquid delivered by the delivery arrangement (5) into the milk transport line (1) and the first point of time at which cleaning liquid starts flowing through the milk transport line (1), and to receive input from the second sensor arrangement (8) regarding the second point of time at which cleaning liquid has traveled through the milk transport line (1), and configured to control the delivery arrangement (5) on basis of said input received from said first and second sensor arrangement (7, 8),
 wherein the control unit (9) is configured to determine a volume and/or a length of the milk transport line (1) on basis of said input from said first and second sensor arrangement (7, 8), and configured to control the delivery arrangement (5) on basis thereof.

2. The milking arrangement according to claim 1, wherein the milking arrangement comprises a valve device (10) provided in the milk transport line (1) adjacent the milk container (3), and the cleaning arrangement (4) comprises a cleaning return line (11) extending from said valve device (10) to the delivery arrangement (5).

3. The milking arrangement according to claim 2, wherein the second sensor arrangement (8) is configured to detect the second point of time at which cleaning liquid has traveled through the milk transport line (1) and through the cleaning return line (11), and the control unit (9) is configured to determine the volume of the milk transport line (1) and the cleaning return line (11) on basis of said input from said first and second sensor arrangement (7, 8), and configured to control the delivery arrangement (5) on basis thereof.

4. The milking arrangement according to claim 1, wherein the first sensor arrangement (7) comprises a flow meter (12).

5. The milking arrangement according to claim 1, wherein the delivery arrangement (5) comprises a tray (14) via which the cleaning liquid is conducted to the milk transport line (1), and the first sensor arrangement (7) comprises a level meter (15) arranged in said tray (15).

6. The milking arrangement according to claim 1, wherein the first sensor arrangement (7) comprises the pump (6).

7. The milking arrangement according to claim 1, wherein the second sensor arrangement (8) comprises any of a flow meter, a temperature sensor or an electric conductivity sensor.

8. The milking arrangement according to claim 2, wherein the cleaning return line (11) is provided with a drain branch (16) and a valve arrangement (17) configured to open for expelling of cleaning liquid through the drain branch (16) or to close the drain branch (16) and to open for return of the cleaning liquid to the delivery arrangement (5), and the control unit (9) is configured to control said valve arrangement (17) on basis of the determined volume and/or length of the milk transport line (1).

9. The milking arrangement according to claim 1, wherein the cleaning arrangement (4) comprises a purge arrangement (18), and the control unit (9) is configured to control said purge arrangement (18) on basis of the determined volume of the milk transport line (1).

10. The milking arrangement according to claim 1, wherein the control unit (9) is configured to perform the determination of the volume and/or length of the milk transport line (1) repeatedly.

11. The milking arrangement according to claim 10, wherein the control unit (9) is configured to save in a readable memory the volume and/or length of the milk transport line (1) determined in connection to a set up of the milking system and to compare later determinations of the volume and/or length of the milk transport line (1) performed by the control unit (9) with the volume and/or length of the milk transport line (1) determined in connection to said set up.

12. The milking arrangement according to claim 1, wherein the milking arrangement comprises a plurality of milk transport lines (1, 1'), each one of the milk transport lines (1, 1') being connected to a plurality of milking stations (2, 2') and being connected in parallel with each other and connected to the cleaning arrangement (4), wherein the control unit (9, 9') is configured to determine a volume and/or length of each milk transport line (1) on basis of input from said first and second sensor arrangements (7, 8), and configured to control the delivery arrangement (5) for delivery of cleaning liquid to the respective transport line (1, 1') during cleaning thereof on basis of the determined volume and/or length of the respective transport line (1).

13. The milking arrangement according to claim 12, wherein the control unit (9) is subdivided into a plurality of sub control units (9, 9') and each milk transport line (1, 1') has its own dedicated control sub-unit (9, 9') configured to control the cleaning of the milk transport line (1, 1') to which it is dedicated.

14. A method of controlling a milking arrangement, said arrangement comprising
a milk transport line (1),
a plurality of milk stations (2) connected to the milk transport line (1),
a milk container (3) connected to the milk transport line (1) and configured to receive milk transported from the milk stations (2) to the milk container (3) via the milk transport line (1), and
a cleaning arrangement (4) configured to introduce a liquid into the milk transport line (1) and to transport the cleaning liquid through the milk transport line (1), said cleaning arrangement (4) comprising
a delivery arrangement (5) configured to deliver a cleaning liquid into the milk transport line (1),
a pump (6) configured to pump the cleaning liquid through the milk transport line (1) at a pressure larger than atmospheric pressure, thereby filling the transport line (1) with cleaning liquid,
a first sensor arrangement (7) configured to measure an amount of cleaning liquid delivered by the delivery arrangement (5) into the milk transport line and to detect the point of time at which cleaning liquid starts flowing through the milk transport line,
a second sensor arrangement (8) configured to detect the point of time at which cleaning liquid has traveled through the milk transport line (1), and
a control unit (9) comprising a readable storage memory and a processor,
said method comprising the steps of:
registering a first point of time of a start of delivery of cleaning liquid into the milk transport line and storing said registration in said storage memory (S1),
registering a second point of time at which the cleaning liquid entering the milk transport line at the first point of time has traveled through the milk transport line and storing said registration in said storage memory (S2),
registering an amount of cleaning liquid that has been delivered into the milk transport line from the first point of time to the second point of time and storing said registration in said storage memory (S3),
determining, by means of said processor, a volume and/or length of the milk transport line on basis of said registrations (S4), and
controlling operation of the delivery arrangement (5) on basis of the determined volume and/or length (S5).

15. The method according to claim 14, wherein the method comprises the further steps of:
storing in said memory an inner diameter of tubes defining the milk transport line (S5a), and
storing on said memory an inner volume of any further component arranged along the milk transport line (1), wherein the further component is a component that will be filled with the cleaning liquid during cleaning of the milk transport line (S5b),
determining, by means of said processor, the length of the milk transport line (1) on basis of the determined volume and/or length of the milk transport line (1), said inner diameter and said inner volume of further components (S5c), and
controlling the operation of the delivery arrangement (5) on basis of the determined length of the milk transport line (S5d).

16. The milking arrangement according to claim 4, wherein the delivery arrangement (5) comprises a tray (14) via which the cleaning liquid is conducted to the milk transport line (1), and the first sensor arrangement (7) comprises a level meter (15) arranged in said tray (15).

17. The milking arrangement according to claim 16, wherein the first sensor arrangement (7) comprises the pump (6).

18. The milking arrangement according to claim 17, wherein the second sensor arrangement (8) comprises any of a flow meter, a temperature sensor or an electric conductivity sensor.

19. The milking arrangement according to claim 3, wherein the cleaning return line (11) is provided with a drain branch (16) and a valve arrangement (17) configured to open for expelling of cleaning liquid through the drain branch (16) or to close the drain branch (16) and to open for return of the cleaning liquid to the delivery arrangement (5), and the control unit (9) is configured to control said valve arrangement (17) on basis of the determined volume and/or length of the milk transport line (1).

20. The milking arrangement according to claim 1, wherein the control unit (9) is configured to perform the determination of the volume and/or length of the milk transport line (1) repeatedly, at the beginning of each new cleaning sequence.

\* \* \* \* \*